(12) United States Patent
Erbert et al.

(10) Patent No.: US 6,760,356 B2
(45) Date of Patent: Jul. 6, 2004

(54) APPLICATION OF YB:YAG SHORT PULSE LASER SYSTEM

(75) Inventors: Gaylen V. Erbert, Livermore, CA (US); Subrat Biswal, Laurel, MD (US); Joseph M. Bartolick, Livermore, CA (US); Brent C. Stuart, Livermore, CA (US); John K. Crane, Pleasanton, CA (US); Steve Telford, Livermore, CA (US); Michael D. Perry, Poway, CA (US)

(73) Assignee: The Regents of the University of California, Oakland, CA (US)

(*) Notice: Subject to any disclaimer, the term of this patent is extended or adjusted under 35 U.S.C. 154(b) by 50 days.

(21) Appl. No.: 10/118,292

(22) Filed: Apr. 8, 2002

(65) Prior Publication Data

US 2003/0189959 A1 Oct. 9, 2003

(51) Int. Cl.$^7$ .......................... H01S 3/081; H01S 3/10; G02B 6/02; H04B 10/00
(52) U.S. Cl. ......................... 372/93; 373/25; 385/123; 359/173
(58) Field of Search ............................. 372/25, 93, 5, 372/30; 359/161, 173; 385/123

(56) References Cited

U.S. PATENT DOCUMENTS

| | | | | |
|---|---|---|---|---|
| 5,329,398 A | * | 7/1994 | Lai et al. ................ | 359/566 |
| 5,572,355 A | | 11/1996 | Cotton et al. | |
| 5,572,358 A | * | 11/1996 | Gabl et al. ............... | 359/347 |
| 5,592,327 A | * | 1/1997 | Gabl et al. ............... | 359/348 |
| 5,720,894 A | * | 2/1998 | Neev et al. ............... | 216/65 |
| 5,726,855 A | * | 3/1998 | Mourou et al. ........... | 361/213 |
| 5,757,839 A | | 5/1998 | Biswal et al. | |
| 5,862,845 A | * | 1/1999 | Chin et al. .............. | 144/329 |
| 6,016,324 A | | 1/2000 | Rieger et al. | |
| 6,081,543 A | * | 6/2000 | Liu et al. ................ | 372/102 |
| 6,198,568 B1 | * | 3/2001 | Galvanauskas et al. ..... | 359/332 |
| 6,208,458 B1 | * | 3/2001 | Galvanauskas et al. ..... | 359/345 |
| 6,212,215 B1 | | 4/2001 | Payne et al. | |
| 6,249,630 B1 | * | 6/2001 | Stock et al. ............. | 385/123 |
| 6,482,199 B1 | * | 11/2002 | Neev ..................... | 606/10 |
| 6,549,608 B1 | * | 4/2003 | Mamine et al. ........... | 378/34 |

FOREIGN PATENT DOCUMENTS

| | | |
|---|---|---|
| WO | WO 92/09127 | 5/1992 |
| WO | WO 01/43242 A1 | 6/2001 |

OTHER PUBLICATIONS

Strickland, D, et al., "Compression of Amplified Chirped Optical Pulses," Optics Communications, Oct. 15, 1985, pp. 447–449, vol. 55, No. 6, Elsevier Science Publishers B.V..
Sano, E, et al., "Development of Sub-ps Yb:YAG Laser for Material Processing," Advanced High-Power Lasers, (2000), pp. 633–637, Proceedings of SPIE vol. 3889.
Beach, R. J., et al., High–Average–Power Diode–Pumped Yb:YAG Lasers, Lawrence Livermore National Laboratory, Preprint UCRL–JC–133848, Oct. 1, 1999, 17 pages.
Perry, M. D, et al., "Terawatt to Petawatt Subpicosecond Lasers," Science, vol. 264, May 13, 1994, pp. 917–923.

* cited by examiner

Primary Examiner—Don Wong
Assistant Examiner—Phillip Nguyen
(74) Attorney, Agent, or Firm—Michael C. Staggs; Alan H. Thompson (57) ABSTRACT

A diode pumped, high power (at least 20W), short pulse (up to 2 ps), chirped pulse amplified laser using Yb:YAG as the gain material is employed for material processing. Yb:YAG is used as the gain medium for both a regenerative amplifier and a high power 4-pass amplifier. A single common reflective grating optical device is used to both stretch pulses for amplification purposes and to recompress amplified pulses before being directed to a workpiece.

80 Claims, 2 Drawing Sheets

APPLICATION OF YB:YAG SHORT PULSE LASER SYSTEM

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a diode pumped, high power, short pulse, single common reflective grating, chirped-pulse amplified laser (i.e., CPA) using an effective gain material, and more specifically, it relates to a method of producing holes or cuts with clearly differentiated sides and edges by employing such lasers.

2. Description of Related Art

High power laser systems (greater than 20W) with short pulses of the order of less than 10 picoseconds (ps) are of commercial interest for material processing. Such short pulse, (less than 10 ps) high power lasers have advantages over nanosecond pulse lasers for certain material processing applications. The mechanism for material removal is fundamentally different in the short pulse regime. In particular, less heat is dissipated into the surrounding substrate for a given energy and the subsequent removal of material is localized to the illuminated region. Therefore, short pulse lasers can produce very clean holes or cuts during material processing with clearly differentiated sides and edges.

An exemplary use in industry of such a system involves high precision machining of metals and alloys. Conventional mechanical lathes and machine tools are effective for cutting applications down to approximately 100 microns. Below this level, electron beam or laser tools are typically used for cutting or high precision machining (sculpting, drilling). Both electron beam and existing industrial laser technology remove material by a conventional thermal process where the material to be removed is heated to the melting or boiling point. The temperature of the surrounding material is determined by standard heat conduction from the region of interest. While small-scale features (<100 microns) are readily achieved, they are often surrounded by a resolidified material (slag) and a significant heat-affected or shock zone often requiring post processing (e.g., annealing, electropolishing, etc.). This heat-affected zone alters the properties of the material in the vicinity of the machined surface, often resulting in reduced material strength or modification of the composition of the material, particularly in the case of alloys.

A need still exists to reduce or essentially eliminate slag and/or heat-affected zones during material processing. There are various laser materials that have been incorporated into systems directed toward such needs. An exemplary system, such as Nd:YAG, can provide essentially the same power as that of the present invention, however, Nd:YAG systems are incapable of providing the needed short pulses due to a lack of bandwidth. Nd:Glass and Ti: Sapphire systems can provide the needed short pulses, but they have many inherent problems in providing sufficient average power.

SUMMARY OF THE INVENTION

Accordingly, the invention provides a high average power, short pulse laser system that uses end-pumped amplifiers in a chirped-pulse amplification architecture to produce pulses capable of material processing whose controlled output is directed to a workpiece.

The present invention uses a mode-locked laser source to generate at least 50 MHz for up to 8 ps, chirped pulses with sufficient power and $TEM_{00}$ spatial mode structure. The output bandwidth of the oscillator is sufficient to support about a 1 ps pulse. The mode-locked laser source output is stretched using a common reflective diffraction grating contained in a pulse stretcher-compressor device, amplified by at least two amplifier stages, then recompressed by the common reflective diffraction grating stretcher-compressor device and directed by a beam delivery system to a desired workpiece. Between each laser subsystem, (usually computer based), a pointing and centering loop actively controls laser beam alignment.

A first pre-amplifier located after the stretcher is a linear-cavity regenerative amplifier (i.e., regen). The pre-amplifier, which can consist of multiple stages, amplifies the stretched pulses, for example, from a 50 MHz input pulse train and converts such a pulse down to 10 KHz, preferably 4 KHz, using switching of a cavity Pockels cell of the regen. The output of the regen is sent to a power amplifier that boosts the power up to greater than 20W.

The present system provides for a high average power, (greater than 20W with pulse-widths less than 2.5 ps), cost effective compact system which combines the functionality of a stretcher and compressor employing a single high precision reflective optical grating. The present laser system is capable of achieving desired power levels having necessary pulse-widths to perform high precision machining (e.g., holes or cuts with clearly differentiated sides and edges). The present invention converts the region to be removed from the workpiece from the solid-state to the plasma state so quickly that there is insufficient time for significant heat transfer beyond the depth of material removed. This results in the ability to perform extremely high precision machining of metals or alloys with essentially no slag (i.e., molten residue) or heat affected-zone and eliminates the need for cooling of the part during the machining process.

DETAILED DESCRIPTION OF THE INVENTION

General Description

Figure 1:
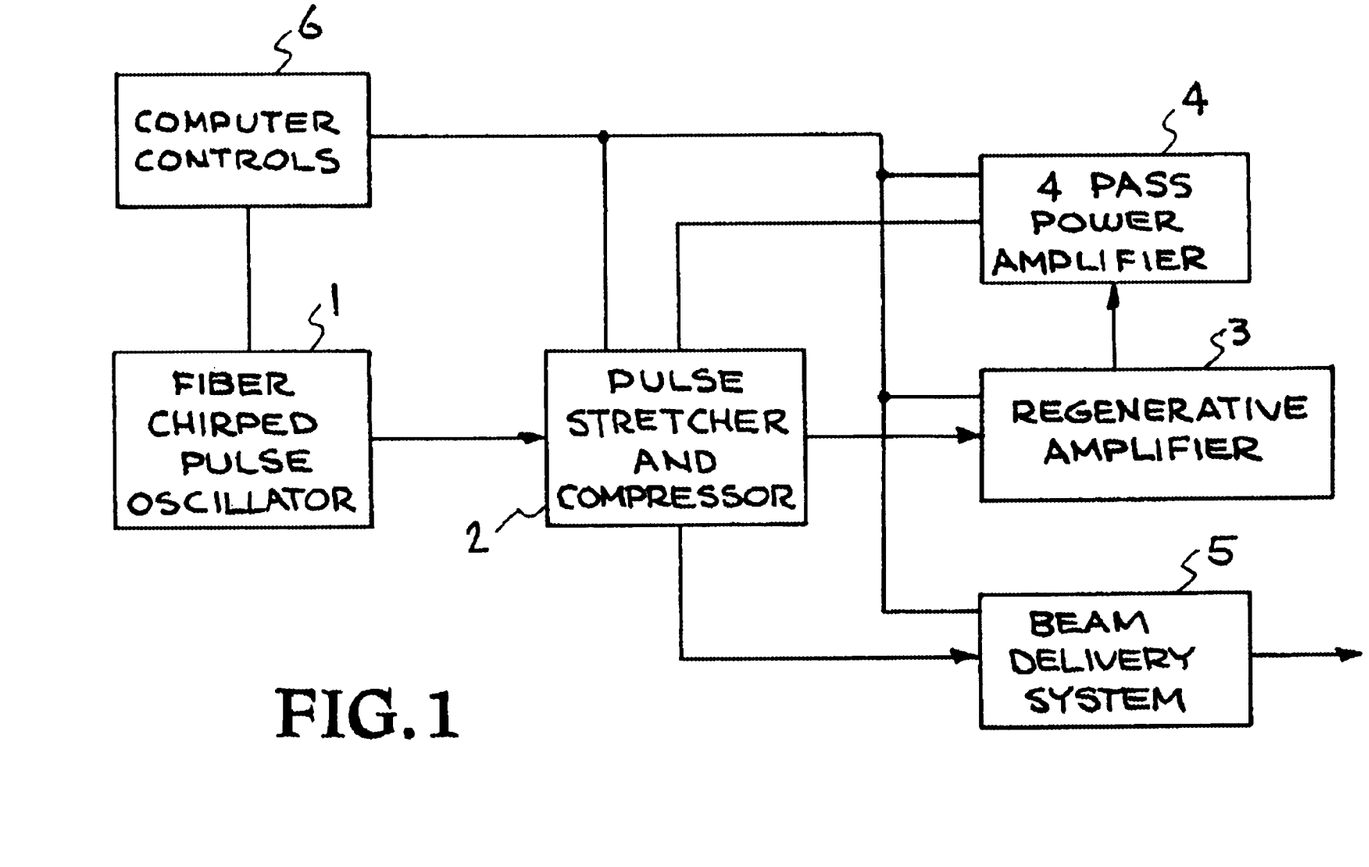
FIG. 1 is a simplified block level diagram of an exemplary drilling apparatus incorporating a high average power single grating stretcher-compressor laser system of the invention.

A controlled chirped-pulse amplified Yb:YAG laser utilized in the present invention is a high average power system that produces short pulse-widths for various applications. As shown in FIG. 1, the overall system contains a laser source 1; a combination pulse stretcher and compressor, (herein referred to as "stretcher-compressor device") 2; a pre-amplifier constructed to receive stretched laser pulses and to produce amplified stretched pulses 3; a power amplifier constructed to receive and to produce further amplified stretched pulses 4; a beam delivery system 5; and a control system to monitor and control laser power levels and maintain alignment 6. The laser source 1 is typically a commercially available fiber oscillator capable of providing the necessary bandwidth and high repetition rate for the invention. However, any laser material and mode-locking mechanism capable of producing pulses of the desired duration and bandwidth can be employed. Exemplary laser materials include Neodymium(Nd)-doped glass, Neodymium-doped yttrium lithium fluoride, Yb:YAG, Ti:Sapphire, Yb:glass, KGW, KYW, YLF, S-FAP, YALO, YCOB, and GdCOB or other broad bandwidth solid state materials that can be diode-pumped to produce lasing gain at the wavelength of the stretched laser pulses.

The stretcher-compressor device 2 is an optical dispersive component that stretches laser pulses for amplification and compresses amplified stretched pulses to a desired temporal pulse-width prior to being directed to a workpiece by a beam delivery system. Related architecture has previously been demonstrated for pulse stretching, (see M.D. Perry, et al, U.S. Pat. No. 5,960,016, titled "Aberration-Free, All-Reflective Laser Pulse Stretcher"). However, the present invention provides an improvement thereof by providing a chirped pulse amplification (i.e., CPA) architecture with a single common reflective diffraction grating, (the structure and method of operation thereof is disclosed in Incorporated by reference Co-pending, Co-filed U.S. application Ser. No. 10/117,744 titled "Short Pulse Laser Stretcher-Compressor Using A Single Common Reflective Grating" by Erbert et al., the disclosure is herein incorporated by reference in its entirety), acting as a dual purpose device, (i.e., a pulse stretcher-compressor device), in a high average power laser system and by not requiring a mirror stripe on the grating.

Temporal stretching of the pulses from the laser source by the stretcher-compressor device or for example by a chirped fiber Bragg grating acting as a pulse stretcher, decreases the peak power intensity of each individually stretched pulse because peak power is inversely proportional to the temporal duration of each individual pulse, (i.e., the longer in temporal pulse duration, the lower in peak power). The present invention uses the stretcher-compressor device 2 to temporally stretch the individual short pulses, (e.g. 8 picoseconds) from the laser source up to nanoseconds in time duration to prevent optical damage to components involved in the amplification process of the laser pulses. The stretched pulses are serially directed to the pre-amplifier 3 for first amplification from at least 50 picojoules of stretched pulse energy. The first amplified stretched pulses are then serially directed to power amplifier 4 to second amplify the energy of each individually stretched pulse from about 0.5 millijoules to at least 25 millijoules. The stretched second amplified pulse output from the power amplifier is then serially directed to the stretcher-compressor device 2 to compress the individual pulses temporally (e.g., to picoseconds). Although the compression process from the stretcher-compressor device 2 results in a slight loss of energy,(e.g., due to reflection losses, etc.), the amplification process is sufficient to produce at least 12.5 millijoules of output system energy to be directed by beam delivery system 5 to a workpiece (not shown) for material processing.

The pre-amplifier 3 and the power amplifier 4 of the present invention can comprise multiple stages and preferably utilize Ytterbium-doped Yttrium aluminum garnet (i.e., Yb:YAG) as the lasing material. Yb:YAG is the optimum choice among several suitable lasing materials because the material has the properties of low thermal loading, a long upper state storage time, a suitable wavelength of absorption to enable direct diode pumping, and sufficient gain bandwidth to support the amplification with minimal spectral narrowing of the pulse. However, any lasing material with sufficient spectral bandwidth, a long upper state storage lifetime, low thermal loading properties, and that can also be directly diode pumped may be used. Exemplary laser materials are Chromium-doped $LiSrAlF_6$ (and related compounds, e.g., Cr:LiSrGaAlF), Neodymium(Nd)-doped glass, and Neodymium-doped yttrium lithium fluoride, Ti:Sapphire, Yb:YAG, Yb:glass, KGW, KYW, YLF, S-FAP, YALO, YCOB, and GdCOB. Although related architecture has previously been demonstrated for the present invention as a whole, (see M.D. Perry, et al, U.S. Pat. No. 5,720,894, titled "Ultrashort Pulse High repetition Rate Laser System for Biological Tissue Processing"), the present invention provides an improvement thereof by providing a short pulse laser system that uses end-pumped Yb:YAG amplifiers in a chirped pulse amplification (CPA) architecture that operates between about 1022 and about 1088 nm, preferably between about 1029 and about 1031 nm, at high average power (e.g., between about 40 and about 100 watts).

Control system 6 can be positioned between each stage of the present invention as an active pointing and centering system to keep the system aligned. An alternative embodiment to keep the system aligned would be by engineering a more stable platform and/or by implementing environmental controls. The control system is designed to compensate for slow drifts due to thermal gradients. The output power is under active control and is monitored in beam delivery system 5 by a power meter and amplifier gain is adjusted using conventional optics (e.g., a waveplate and polarizer combination to attenuate and increase power levels). The beam delivery system 5 uses an opto-mechanical means to direct the high average power, short pulsed output of the present invention to the workpiece (not shown).

Specific Description

A preferred laser source 1, in FIG. 1 is a commercial, 50 MHz mode-locked fiber oscillator with Erbium (Er) as the laser material that operates with multiple longitudinal modes to generate ultra-short pulses. The preferred source for this invention provides a wavelength range between 1022 and 1088 nm, preferably 1029.7 nm. The laser source has an average power output of at least 100 mw, at least 2 nj of energy, and a bandwidth up to 5 nm, preferably greater than about 2 nm. The temporal pulse-width is up to 8.1 ps (uncompressed), preferably about 800 fs (compressed), with an amplitude noise of not more that 5% RMS (i.e., Root Mean Square). The polarization extinction ratio is at least 100:1, with a $TEM_{00}$ mode structure, and a beam divergence of at least 1.5 mrad.

In the present invention, the output from the laser source 1, as described above, is serially directed to the stretcher-compressor device 2 of the system shown in FIG. 1. The pulses produced from these oscillators are very low in energy, (between about 0.1 nj and about 2 nj) and are stretched in time by a factor of five hundred or more prior to amplification.

Pulse stretching prior to amplification is necessary to avoid damaging the laser amplifiers by an intense pulse (e.g., femtosecond and picosecond laser pulses with sufficient energy). A dispersive optical device as shown as the pulse stretcher-compressor device 2 in FIG. 1, (See Incorporated by reference Co-pending, Co-filed U.S. application Ser. No. 10/117,744 titled: "Short Pulse Laser Stretcher-Compressor Using A Single Common Reflective Grating" by Erbert et al. for more detail), is a device in which the time required to traverse the device is a function of the frequency of the light. This is most commonly achieved by devices in which the optical path length is a function of frequency. Examples include propagation through a fiber or a chirped fiber Bragg grating, wherein the variation in optical path length with frequency, $\omega$, is given by the frequency dependence of the refractive index, n(ω), i.e., $L_{opt}=n(\omega)L_{fiber}$. Much higher dispersion can be achieved with pulse stretchers employing a diffraction grating wherein the different frequency components of the laser pulse travel physically different paths determined by the angular dispersion of the diffraction grating, $m\lambda=\sin(\theta_{in})+\sin(\theta_{out})$, where λ is the wavelength of the laser light and $\theta_{in}$ and $\theta_{out}$ are the input and output angles from the diffraction grating, respectively.

The stretched pulse from the stretcher-compressor device 2 is received and amplified by one or more orders of magnitude, with a preferred amplification of six orders of magnitude, (an order of magnitude being a multiplication of 10), to about a millijoule by the pre-amplifier sub-system 3 that receives each respective stretched pulse. Although several conventional types of laser pre-amplifiers may be used here, the preferred embodiment is a regenerative amplifier 3, shown in FIG. 1. In this device, multiple passes of the pulse can be made through a single amplifier lasing material. However, any type of pre-amplifier means operating within the parameters described above, such as for example a Yb-doped fiber amplifier using a large mode-area fiber, (preferably between about 25 and about 50 microns in diameter), constructed for short pulse laser applications can be employed in practice of the invention. Such an exemplary Yb-doped fiber amplifier would allow for a more compact geometry than the present invention because a single pass through such an exemplary amplifier would be capable of power amplification that is similar to the current regen amplifier but with better stability. Another example of a pre-amplifier operating within design parameters is an optical parametric oscillator, (i.e., a nonlinear material capable of producing a coherent beam of light that can be tuned over a wide range of wavelengths) to obtain the required power levels. The repetition rate of the system when operating with a regen as the pre-amplifier is determined by the optical switching within the regenerative amplifier. Switching of the pulse into and out of the regenerative amplifier is accomplished with optical pulse switching technology based on the Pockels or acousto-optics effects.

In the present invention, pulses up to 0.75 mj in energy at 4 KHz (i.e., 3W) are produced by the regen amplifier, which is utilized as a pre-amplifier 3. Following amplification from the regenerative amplifier, pulses are serially directed to a multi-pass amplifier such as a 4-pass power amplifier 4 having one or more Yb:YAG Diode pumped solid state amplifiers collectively capable of generating up to 100 W. However, a two-pass power amplifier having one or more Yb:YAG Diode pumped solid state amplifiers constructed to the design output parameters for the power amplifier component can also be employed in the present invention. The power amplifier usually uses at least two end-pumped heads with lens ducts and kW cw diode arrays (not shown). The present system is constructed to extract the required energy and beam quality in a manner that is different from similar directly diode pumped solid state amplifiers. Similar prior art directly diode pumped systems builds up the amplification from noise in an oscillator configuration. The present system directs a beam to be further amplified from the exemplary pre-amplifier into a multi-pass amplifier configuration and after the required number of passes is completed, the beam has to be directed out of the multi-pass amplification configuration. Thus, the present multi-pass amplifier of the present invention requires technical enhancement over similar prior art multi-pass amplifiers in extracting the energy and beam quality out of the system because there is not a defined cavity mode as in an oscillator. Each amplifier, pumps for example, a 4×40 mm tapered Yb:YAG rod with about 800 W of pump radiation or more. The single-pass gain under normal operation (825 W pump) is about 1.9 for rods that are doped with about 0.55% Yb. Special water-cooled housings (not shown) for rods efficiently dissipate the heat generated from pumping and minimize Amplified Stimulated Emission (ASE) seeded parasitic losses. The power amplifier output optical plane is relayed by an up-collimating afocal telescope (not shown) to a system focusing lens (not shown), for a distance of about 16 to about 18 meters through the stretcher-compressor device.

Prior to output to the system-focusing lens, output pulses from the 4-pass amplifier 4 are directed to stretcher-compressor device 2 for compression (See Co-pending, Co-filed U.S. application Ser. No. 10/117,744 titled "Short Pulse Laser Stretcher-Compressor Using A Single Common Reflective Grating" by Erbert et al., for the compressor beam path) of the stretched amplified pulses from the 4-pass amplifier 4 section of the system. The compressing process incorporates the same single, highly efficient (i.e., greater than 90% diffraction efficiency), common reflective diffraction multilayer dielectric grating that is used for stretching the master oscillator's output pulses. The stretcher-compressor device causes compression of an amplified stretched pulse from about 4 nsec to about 2 ps. This final temporal pulse-width allows for a desired upper limit in order to achieve maximum penetration of the workpiece (not shown)within permissible time frames, (e.g., from about 0.1 second to about 60 seconds), with no heat-affected or slag zone.

The pulse stretcher-compressor 2 dielectric grating exhibits a diffraction efficiency greater than 97% at the 1030 nm design wavelength. Consequently, the throughput of the four-pass grating compressor is at least 70%. The method of producing high peak power ultrashort pulses where the initial short pulse is stretched prior to amplification, amplified and then recompressed in a separate compressor not part of the stretcher, is known to those skilled in the art as chirped-pulse amplification. (See Strickland, D.; Mourou, G. "Compression of amplified chirped optical pulses," *Optics Communications*, vol. 56, (no.3), 1 December 1985. p.219–21, and M. D. Perry and G. Mourou, "Terawatt to Petawatt Subpicosecond Lasers," *Science,* 264, 917 (1994).

The output from the stretcher-compressor is directed to a workpiece held in an evacuated chamber (not shown) by a computer-controlled beam delivery system 5. The power output is computer controlled 6 with feedback loops to maintain from about 0.1 to about 20 Watts of average power, (i.e., for a 4 KHz repetition rate from the system, 12.5 millijoules of energy is needed for 20 Watts of average power).

Figure 2:
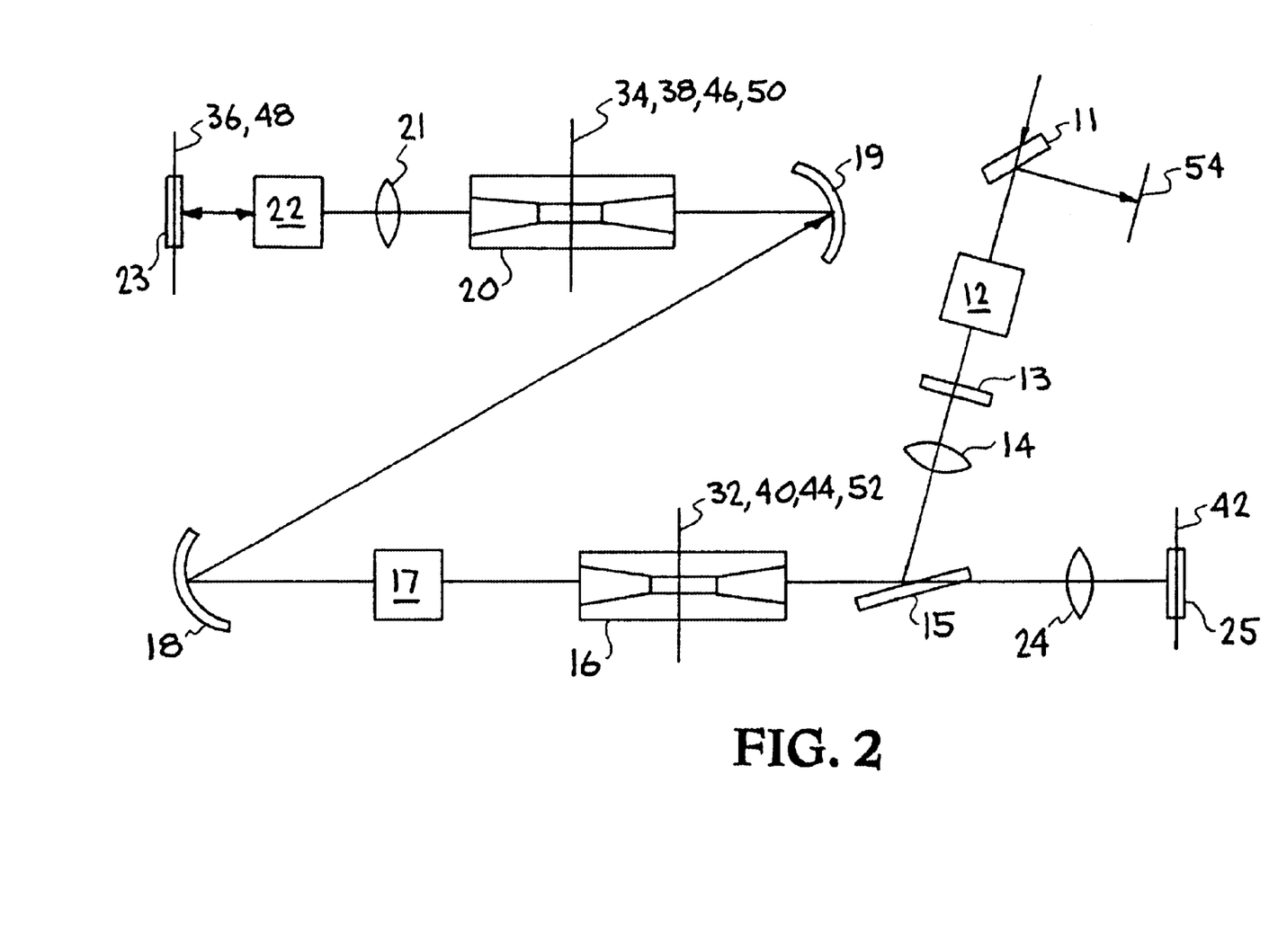
FIG. 2 shows a view of the optical relay beam path through a 4-pass amplifier of the invention.

The method of the 4-pass amplifier optical relay embodiment constructed to principles of the present invention is generally illustrated in FIG. 2. In this embodiment, a thin film beam polarizer 11 receives laser pulses from a pre-amplifier (not shown). A Faraday rotator 12 and a half-wave plate 13 enable a proper plane of polarization for injection of the laser pulses to be amplified into the 4-pass beam path configuration. A lens 14, preferably a 50-cm positive spherical lens and an amplifier rod 16, preferably a Yb:Yag laser material which is optically constrained as a 25-cm thermal lens under the design of the present invention, can operate as a relay telescope that relays an object plane from the pre-amplifier output (not shown) to an image plane 32 intermediate the rod faces of amplifier rod 16. The laser pulses are received and amplified by amplifier rod 16 and an amplifier rod 20, preferably a Yb:Yag laser material additionally constrained as a 25-cm thermal lens under the present design. Thermally-induced birefringence is a potential loss mechanism and must be carefully controlled in the optical design. Thus, a quarter-wave rotator is interposed between amplifier rod 16 and amplifier rod 20 to receive and compensate for thermally induced birefringence in the amplification process. A pair of mirrors 18, and 19, preferably concave mirrors with radii of curvatures of 100 cm, can direct the laser pulses and can operate as an optical relay of image plane 32 which becomes an object plane from amplifier rod 16 to an image plane 34 intermediate the rod faces of amplifier rod 20 when adapted with the thermal 25-cm lensing properties of amplifiers 16 and 20. A lens 21, preferably a 50-cm positive spherical lens, and the 25-cm thermal lens property of amplifier 20, optically relays image plane 34 which becomes an object plane from amplifier rod 20 to an image plane 36 positioned on a retro-reflecting mirror 23. The optical path then reverses itself with the optical image plane 36 from mirror 23 being an object plane that is optically relayed to image plane 38 intermediate the rod faces of amplifier rod 20, image plane 38 becomes an object plane that is optically relayed to an image plane 40 intermediate the rod faces of amplifier rod 16, and wherein Faraday rotator 22 and the thermally compensating quarter-wave rotator 17 are designed to allow the proper polarization on the return path for transmission through an input thin film polarizer 15. Image plane 40 becomes an object plane that is optically relayed by the telescope pair of a lens 24, preferably a 40-cm asphere and by the 25-cm thermal lens property of amplifier 16 to an image plane 42 positioned at retro-reflecting mirror 25. The optical path reverses itself, wherein object plane 42 becomes image plane 44 intermediate the rod faces on amplifier rod 16. Image plane 44 becomes an object plane optically relayed to image plane 46 intermediate the rod faces on amplifier rod 20. Image plane 46 becomes an object plane optically relayed to image plane 48 at retro-reflecting mirror 23. The optical path is again reversed wherein image plane 48 becomes an object plane that is optically relayed to image plane 50 intermediate the rod faces on amplifier rod 20. Image plane 50 becomes an object plane that is optically relayed to image plane 52 intermediate the rod faces on amplifier rod 16. Faraday rotator 22 and the thermally compensating quarter-wave rotator 17 are adapted for the proper polarization on the return path for reflection from the input thin film polarizer 15. Image plane 52 becomes an object plane that is optically relayed by the telescope pair of lens 14 and by the 25-cm thermal lens property of amplifier 16 to a predetermined optical output image plane 54 external to the 4-pass amplifier configuration. Waveplate 13 and Faraday rotator 12 are adapted for the proper polarization so that the thin film beam polarizer 11 can act as an extracting reflector to enable output of the laser pulses from the 4-pass amplifier design.

The apparatus of the present invention can produce a plurality of laser pulses with pulse durations from about 0.05 to less than about 10 picoseconds, with a bandwidth between about 1.5 and about 35 nm. Material processing experiments are performed, wherein the energy per pulse obtainable from the laser system is variable from 1 millijoule to about 12.5 millijoules (at repetition rates greater than 4 kHz) deliverable in a beam having a spot size variable to at least 0.016" in diameter. Thus, a focused fluence from about 0.1 to less than about 20 J/cm is readily achieved. Such may be effective in ablating any type of workpiece such as metals, (e.g., aircraft parts), alloys, ceramics, amorphous materials and crystals. Various target plane diagnostics such as near and far field cameras temporal detectors, power monitor, autocorrelator and spectrometer record the important parameters of the laser beam at the work piece. The focusing conditions must achieve the threshold fluence of at least 0.1 J/cm to achieve the optimum ablation conditions.

Changes and modifications in the specifically described embodiments can be carried out without departing from the scope of the invention, which is intended to be limited by the scope of the appended claims.

What is claimed is:

1. A short pulse laser apparatus, comprising:
    a source of laser pulses,
    a pulse stretcher-compressor configured for stretching said laser pulses to produce one or more stretched laser pulses and configured for producing one or more compressed amplified laser pulses obtained from stretched amplified laser pulses,
    an amplifier, constructed to receive each of said stretched pulses to produce amplified stretched pulses,
    means for maintaining alignment of said stretched laser pulses and said compressed amplified pulses, and maintaining power levels of said source of laser pulses and said amplifier; and
    means for directing said compressed amplified pulses toward a workpiece.

2. The apparatus of claim 1, wherein said compressed amplified pulses have a pulse duration from about 0.05 picoseconds to less than about 10 picoseconds, a bandwidth between about 1.5 nm and about 35 nm, and wherein said laser pulses have a high average power of at least 20 watts.

3. The apparatus of claim 1, wherein said source of laser pulses produces a pulsed, polarized laser output beam comprising a plurality of laser pulses, wherein each pulse of said plurality of laser pulses has a pulse repetition rate of 1 Hz to 50 MHz, a wavelength in the range from about 1022 nm to about 1088 nm, a bandwidth of up to about 2 nm, and a pulse duration from about 0.1 picoseconds to about 8 picoseconds.

4. The apparatus of claim 1, wherein said source of laser pulses comprises a lasing material selected from the group consisting of Erbium, Neodymium(Nd)-doped glass, Neodymium-doped yttrium lithium fluoride, Yb:YAG, Ti:Sapphire, Yb:glass, KGW, KYW, YLF, S-FAP, YALO, YCOB, and GdCOB.

5. The apparatus of claim 1, wherein said amplifier comprises a lasing material selected from the group consisting of Neodymium(Nd)-doped glass, Neodymium-doped yttrium lithium fluoride, Yb:YAG, Ti:Sapphire, Yb:glass, KGW, KYW, YLF, S-FAP, YALO, YCOB, and GdCOB.

6. The apparatus of claim 1, wherein said pulse stretcher-compressor further comprises a chirped fiber Bragg grating.

7. The apparatus of claim 1, wherein said pulse stretcher-compressor further comprises a single common reflective diffraction grating.

8. The apparatus of claim 7, wherein said single common reflective diffraction grating exhibits a diffraction efficiency greater than 90% at wavelengths from about 1022 nm to about 1088 nm.

9. The apparatus of claim 7, wherein said single common reflective diffraction grating exhibits a diffraction efficiency greater than 97% at 1030 nm.

10. The apparatus of claim 1, wherein said pulse stretcher-compressor is a single common reflective dielectric diffraction grating.

11. The apparatus of claim 1, wherein said pulse stretcher-compressor comprises a single common reflective multi-layer dielectric diffraction grating having dimensions between about 100 mm×200 mm and about 500 mm×1000 mm.

12. The apparatus of claim 11, wherein said single common reflective multi-layer dielectric diffraction grating exhibits a diffraction efficiency greater than 90% at wavelengths from about 1022 nm to about 1088 nm.

13. The apparatus of claim 11, wherein said single common reflective multi-layer dielectric diffraction grating exhibits a diffraction efficiency greater than 97% at 1030 nm.

14. A short pulse laser apparatus for material processing, comprising:
   a source of laser pulses,
   a pulse stretcher-compressor configured for stretching said laser pulses to produce one or more stretched laser pulses and configured for producing one or more compressed second amplified laser pulses obtained from a power amplifier,
   a pre-amplifier, comprising Yb:YAG lasing material, constructed to receive each of said stretched pulses to produce amplified stretched pulses,
   a power amplifier, comprising at least 1 Yb:YAG head, constructed to receive each of said amplified stretched pulses directed from said pre-amplifier to produce second amplified stretched pulses,
   means for maintaining alignment of said stretched laser pulses and said compressed second amplified pulses, and maintaining power levels of said source of laser pulses, said pre-amplifier and said power amplifier; and
   means for directing said compressed second amplified laser pulses toward a workpiece.

15. The apparatus of claim 14, wherein said compressed second amplified pulses have a pulse duration from about 0.05 picoseconds to less than about 10 picoseconds, and a bandwidth between about 1.5 nm and about 35 nm.

16. The apparatus of claim 14, wherein said pre-amplifier comprises a regenerative amplifier constructed for each of said laser pulses to be directed from said stretcher-compressor and into said regenerative amplifier and further constructed to pass said stretched laser pulses for a plurality of passes to an output of at least 3 watts of average power.

17. The apparatus of claim 16, wherein a pulse repetition rate for said apparatus is between about 0.1 KHz and about 10 KHz.

18. The apparatus of claim 14, wherein said pre-amplifier comprises a fiber amplifier constructed for each of said laser pulses to be directed from said stretcher-compressor and into said fiber amplifier and further constructed to pass said stretched laser pulses for a single pass output of at least 3 watts of average power.

19. The apparatus of claim 14, wherein said pre-amplifier comprises an optical parametric oscillator constructed for each of said laser pulses to be directed from said stretcher-compressor and into said fiber amplifier and further constructed to pass said stretched laser pulses for a single pass output of at least 3 watts of average power.

20. The apparatus of claim 14, wherein said power amplifier comprises a 4-pass power amplifier, comprising 2 Yb:YAG heads, constructed for each of said stretched laser pulses to be directed from said pre-amplifier and into said 4-pass power amplifier and further constructed to pass said stretched laser pulses through each of said heads for a plurality of passes to an output of at least 20 watts of average power.

21. The apparatus of claim 20, wherein said 4-pass amplifier further comprises an optical relay comprising: a) a first relay telescope having a first focusing element and a first amplifier rod thermal lens configured for optically relaying in the following first forward sequence a predetermined object plane to a first image plane intermediate a position of the rod faces of said first amplifier rod thermal lens by said first relay telescope wherein a thin film polarizer is interposed between said first optical focusing element and said first amplifier rod thermal lens so that a series of polarized laser pulses can be injected into the 4-pass amplifier beam path, b) a second relay telescope having one or more concave mirrors and a second amplifier rod thermal lens configured for optically relaying said first image plane to a second image plane intermediate a position of the rod faces of said second amplifier rod thermal lens by said second relay telescope, c) a third relay telescope having said second amplifier rod thermal lens and a second focusing element configured for optically relaying said second image plane to a predetermined third image plane wherein a positioned first retro-reflecting element at said third image plane reverses said first forward sequence and said third image plane is optically relayed to a fourth image plane intermediate a position of the rod faces of said second amplifier rod thermal lens and wherein said fourth image plane is optically relayed to a fifth image plane intermediate a position of the rod faces of said first amplifier rod, d) a fourth relay telescope having said first amplifier rod thermal lens and a third focusing element configured for optically relaying said fifth image plane from said first amplifier rod thermal lens to a second predetermined image plane wherein a positioned second retro-reflecting element reverses said first forward sequence to a second forward sequence wherein one or more interposed optically rotators in said 4-pass amplifier beam path are arranged to enable said thin film polarizer to extract said polarized laser pulses out of said 4-pass amplifier beam path when said first retro-reflecting element reverses said second forward sequence and; e) a fifth relay telescope wherein said first relay telescope and a plurality of interposed optical elements are configured to extract and direct a final image plane at an intermediate position of said first amplifier rod thermal lens rod faces to an output image plane.

22. The apparatus of claim 21, wherein said amplifier rod thermal lens has a focal length of 25 cm.

23. The apparatus of claim 14, wherein said pre-amplifier comprises a lasing material selected from the group consisting of Neodymium(Nd)-doped glass, Neodymium-doped yttrium lithium fluoride, Yb:YAG, Yb:glass, KGW, KYW, Ti:Sapphire, YLF, S-FAP, YALO, YCOB, and GdCOB.

24. The apparatus of claim 14, wherein said power amplifier comprises a lasing material selected from the group consisting of Neodymium(Nd)-doped glass, Neodymium-doped yttrium lithium fluoride, Yb:YAG, Yb:glass, KGW, KYW, YLF, S-FAP, YALO, YCOB, and GdCOB.

25. The apparatus of claim 14, wherein said pulse stretcher-compressor further comprises a chirped fiber Bragg grating.

26. The apparatus of claim 14, wherein said pulse stretcher-compressor further comprises a single common reflective diffraction grating.

27. The apparatus of claim 26, wherein said single common reflective diffraction grating exhibits a diffraction efficiency greater than 90% at wavelengths from about 1022 nm to about 1088 nm.

28. The apparatus of claim 26, wherein said single common reflective diffraction grating exhibits a diffraction efficiency greater than 97% at 1030 nm.

29. The apparatus of claim 14, wherein said pulse stretcher-compressor is a single common reflective dielectric diffraction grating.

30. The apparatus of claim 14, wherein said pulse stretcher-compressor is a single common reflective multi-layer dielectric diffraction grating having dimensions between about 100 mm×200 mm and about 500 mm×1000 mm.

31. The apparatus of claim 30, wherein said single common reflective multi-layer dielectric diffraction grating that exhibits a diffraction efficiency greater than 90% at wavelengths from about 1022 nm to about 1088 nm.

32. The apparatus of claim 30, wherein said single common reflective multi-layer dielectric diffraction grating exhibits a diffraction efficiency greater than 97% at 1030 nm.

33. A short pulse laser method for material processing, comprising:
producing a laser source of pulses,
optically stretching said laser pulses,
amplifying a predetermined energy of each of said stretched laser pulses,
optically compressing said stretched laser pulses to produce one or more amplified compressed laser pulses, wherein said stretched laser pulses and said one or more amplified compressed laser pulses are interleaved along a common area from a single common reflective diffraction grating,
maintaining alignment of said laser source of pulses, said stretched laser pulses, said one or more compressed amplified pulses, and maintaining power levels of said laser pulses from said laser source of pulses and said one or more amplified compressed laser pulses; and
directing said one or more compressed amplified laser pulses toward a workpiece.

34. The method of claim 33, wherein said one or more amplified compressed laser pulses have a pulse duration from about 0.05 picoseconds to less than about 10 picoseconds, a bandwidth between about 1.5 nm and about 35 nm, and wherein said laser pulses have a high average power of at least 20 watts.

35. The method of claim 33, wherein said laser source of pulses further comprises a pulsed, polarized laser output beam comprising a plurality of laser pulses, wherein each pulse of said plurality of laser pulses has a pulse repetition rate of 1 Hz to 50 MHz, a wavelength in the range from about 1022 nm to about 1088 nm, a bandwidth of up to about 2 nm, and a pulse duration from about 0.1 picoseconds to about 8 picoseconds.

36. The method of claim 33, wherein said laser source of pulses comprises a laser material selected from the group consisting of Erbium, Neodymium(Nd)-doped glass, Neodymium-doped yttrium lithium fluoride, Yb:YAG, Ti:Sapphire, Yb:glass, KGW, KYW, YLF, S-FAP, YALO, YCOB, and GdCOB.

37. The method of claim 33, wherein said optically stretching and said optically compressing of said laser pulses further comprise utilizing a chirped fiber Bragg grating.

38. The method of claim 33, wherein said optically stretching and compressing of said laser pulses further comprises utilizing a single common reflective diffraction grating.

39. The method of claim 38, wherein said single common reflective diffraction grating exhibits a diffraction efficiency greater than 90% at wavelengths from about 1022 nm to about 1088 nm.

40. The method of claim 38, wherein said single common reflective diffraction grating exhibits a diffraction efficiency greater than 97% at 1030 nm.

41. The method of claim 33, wherein said optically stretching and compressing of said laser pulses further comprises utilizing a single common reflective dielectric diffraction grating.

42. The method of claim 41, wherein said single common reflective dielectric diffraction grating is a single common reflective multi-layer dielectric diffraction grating having dimensions between about 100 mm×200 mm and about 500 mm×1000 mm.

43. The method of claim 42, wherein said single common reflective multi-layer dielectric diffraction grating exhibits a diffraction efficiency greater than 90% at wavelengths from about 1022 nm to about 1088 nm.

44. The method of claim 42, wherein said single common reflective multi-layer dielectric diffraction grating exhibits a diffraction efficiency greater than 97% at 1030 nm.

45. A short pulse laser method for material processing, comprising:
producing a laser source of pulses,
optically stretching said laser pulses,
first amplifying a predetermined energy of each of said optically stretched laser pulses, wherein a pre-amplifier, comprising Yb:YAG lasing material, is constructed to produce first amplified stretched pulses,
second amplifying the energy of each of said first amplified stretched laser pulses, wherein a power amplifier, comprising at least 1 Yb:YAG head, is constructed to produce second amplified stretched pulses,
optically compressing said second amplified stretched pulses to produce second amplified compressed pulses,
maintaining alignment of said laser source of pulses, said first amplified stretched pulses, said second amplified stretched pulses and said second amplified compressed pulses, and maintaining power levels of said laser pulses from said laser source, said pre-amplifier and said power amplifier; and
directing said second amplified compressed pulses toward a workpiece.

46. The method of claim 45, wherein said second amplified compressed pulses have a pulse duration from about 0.05 picoseconds to less than about 10 picoseconds, a bandwidth between about 1.5 nm and about 35 nm, and wherein said laser pulses have a high average power of at least 20 watts.

47. The method of claim 45, wherein said pre-amplifier comprises a regenerative amplifier constructed for each of said optically stretched laser pulses to be directed from said stretcher-compressor and into said regenerative amplifier and further constructed to pass said optically stretched laser pulses for a plurality of passes to an output of at least 3 watts of average power.

48. The method of claim 47, wherein said method further comprises a pulse repetition rate between about 0.1 KHz and about 10 KHz.

49. The method of claim 45, wherein said pre-amplifier comprises a fiber amplifier constructed for each of said laser pulses to be directed from said stretcher-compressor and into said fiber amplifier and further constructed to pass said stretched laser pulses for a single pass output of at least 3 watts of average power.

50. The method of claim 49, wherein said fiber amplifier is a Yb-doped fiber amplifier.

51. The method of claim 45, wherein said pre-amplifier comprises an optical parametric oscillator constructed for each of said laser pulses to be directed from said stretcher-compressor and into said fiber amplifier and further constructed to pass said stretched laser pulses for a single pass output of at least 3 watts of average power.

52. The method of claim 45, wherein said power amplifier comprises a 4-pass power amplifier, comprising 2 Yb:YAG heads, constructed for each of said first amplified stretched pulses to be directed from said pre-amplifier and into said 4-pass power amplifier and further constructed to pass said first amplified stretched laser pulses through each of said heads for a plurality of passes to an output of at least 20 watts of average power.

53. The method of claim 52, wherein said 2 Yb:YAG heads further comprise an amplifier rod each capable of producing a thermal lens, wherein said thermal lens from each of said amplifier rods comprise an optical relay telescope for transferring an object plane at a predetermined distance before said power amplifier along an optic axis to each said amplifier rod and to one or more end mirrors, and to a predetermined output image plane distance.

54. The method of claim 53, wherein said thermal lens has a focal length of 25 cm.

55. The method of claim 45, wherein said pre-amplifier comprises a lasing material selected from the group consisting of Neodymium(Nd)-doped glass, Neodymium-doped yttrium lithium fluoride, Yb:glass, Yb:YAG, Ti:Sapphire, KGW, KYW, YLF, S-FAP, YALO, YCOB, and GdCOB.

56. The method of claim 45, wherein said 4-pass power amplifier, further comprises 2 laser amplifier heads, wherein said 2 laser amplifier heads further comprise a lasing material selected from the group consisting of Neodymium(Nd)-doped glass, Neodymium-doped yttrium lithium fluoride, Yb:YAG, Yb:glass, KGW, KYW, YLF, S-FAP, YALO, YCOB, and GdCOB.

57. The method of claim 45, wherein said optically stretching and said optically compressing of said laser pulses further comprise utilizing a chirped fiber Bragg grating.

58. The method of claim 45, wherein said optically stretching and compressing of said laser pulses further comprises utilizing a single common reflective diffraction grating.

59. The method of claim 58, wherein said single common reflective diffraction grating exhibits a diffraction efficiency greater than 90% at wavelengths from about 1022 nm to about 1088 nm.

60. The method of claim 58, wherein said single common reflective diffraction grating exhibits a diffraction efficiency greater than 97% at 1030 nm.

61. The method of claim 45, wherein said optically stretching and said optically compressing of said laser pulses further comprise a single common reflective dielectric diffraction grating.

62. The method of claim 61, wherein said single common reflective dielectric diffraction grating is a single common reflective multi-layer dielectric diffraction grating having dimensions between about 100 mm×200 mm and about 500 mm×1000 mm.

63. The method of claim 62, wherein said single common reflective multi-layer dielectric diffraction grating exhibits a diffraction efficiency greater than 90% at wavelengths from about 1022 nm to about 1088 nm.

64. The method of claim 62, wherein said single common reflective multi-layer dielectric diffraction grating exhibits a diffraction efficiency greater than 97% at 1030 nm.

65. A short pulse laser method for material processing, comprising:
producing a pulsed laser output beam comprising a plurality of pulses wherein each pulse of said plurality of pulses has an energy and a pulse repetition rate controlled to attain at least 20 Watts of average power; and
directing said pulsed laser output beam onto a workpiece, wherein said plurality of laser pulses has a pulse duration from about 0.05 to less than about 10 picoseconds, a bandwidth between about 1.5 nm and about 35 nm, and a focused fluence from about 0.1 $J/cm^2$ to less that about $20J/cm^2$, wherein each said pulse converts from about 0.01 microns to less than about 1 micron of material of said workpiece from the solid state to the plasma state, wherein said material is removed from said workpiece by hydrodynamic expansion of said plasma.

66. The method of claim 65, wherein said laser output beam produces no slag or heat affected zone.

67. The method of claim 65, wherein said pulse repetition rate enables the production of holes or cuts with dearly differentiated sides and edges.

68. The method of claim 65, wherein said workpiece comprises metals, alloys, ceramics, amorphous materials and crystals.

69. The method of claim 65, wherein said plurality of pulses are stretched and compressed by a chirped fiber Bragg grating configured for stretching and compressing said plurality of pulses.

70. The method of claim 65, wherein said plurality of pulses are stretched and compressed by a single common reflective diffraction grating configured for stretching and compressing said plurality of pulses.

71. The method of claim 70, wherein said single common reflective diffraction grating exhibits a diffraction efficiency greater than 90% at wavelengths from about 1022 nm to about 1088 nm.

72. The method of claim 70, wherein said single common reflective diffraction grating exhibits a diffraction efficiency greater than 97% at 1030 nm.

73. The method of claim 70, wherein said single common reflective diffraction grating is a single common reflective dielectric diffraction grating.

74. The method of claim 73, wherein said single common reflective dielectric diffraction grating is a single common reflective multi-layer dielectric diffraction grating having dimensions between about 100 mm×200 mm and about 500 mm×1000 mm.

75. The method of claim 74, wherein said single common reflective multi-layer dielectric diffraction grating exhibits a diffraction efficiency greater than 90% at wavelengths from about 1022 nm to about 1088 nm.

76. The method of claim 74, wherein said single common reflective multi-layer dielectric diffraction grating exhibits a diffraction efficiency greater than 97% at 1030 nm.

77. The apparatus of claim 1, wherein said amplifier further comprises a preamplifier and a power amplifier having 2 Yb:YAG heads constructed for each of said stretched laser pulses to be directed from said pre-amplifier and into said power amplifier and further constructed to pass said stretched laser pulses through each of said heads for a plurality of passes to an output of at least 20 watts of average power.

78. The apparatus of claim 77, wherein said power amplifier is constructed as a 4-pass amplifier having an optical relay comprising: a) a first relay telescope having a first focusing element and a first amplifier rod thermal lens configured for optically relaying in the following first forward sequence a predetermined object plane to a first image plane intermediate a position of the rod faces of said first amplifier rod thermal lens by said first relay telescope wherein a thin film polarizer is interposed between said first optical focusing element and said first amplifier rod thermal lens so that a series of polarized laser pulses can be injected into the 4-pass amplifier beam path, b) a second relay telescope having one or more concave mirrors and a second amplifier rod thermal lens configured for optically relaying said first image plane to a second image plane intermediate a position of the rod faces of said second amplifier rod thermal lens by said second relay telescope, c) a third relay telescope having said second amplifier rod thermal lens and a second focusing element configured for optically relaying said second image plane to a predetermined third image plane wherein a positioned first retro-reflecting element at said third image plane reverses said first forward sequence and said third image plane is optically relayed to a fourth image plane intermediate a position of the rod faces of said second amplifier rod thermal lens and wherein said fourth image plane is optically relayed to a fifth image plane intermediate a position of the rod faces of said first amplifier rod, d) a fourth relay telescope having said first amplifier rod thermal lens and a third focusing element configured for optically relaying said fifth image plane from said first amplifier rod thermal lens to a second predetermined image plane wherein a positioned second retro-reflecting element reverses said first forward sequence to a second forward sequence wherein one or more interposed optically rotators in said 4-pass amplifier beam path are arranged to enable said thin film polarizer to extract said polarized laser pulses out of said 4-pass amplifier beam path when said first retro-reflecting element reverses said second forward sequence and; e) a fifth relay telescope wherein said first relay telescope and a plurality of interposed optical elements are configured to extract and direct a final image plane at an intermediate position of said first amplifier rod thermal lens rod faces to an output image plane.

79. The apparatus of claim 78, wherein said first amplifier rod thermal lens and said second rod thermal lens focal lengths comprise positive curvature 25-cm lenses.

80. The apparatus of claim 78, wherein said one or more concave mirrors have a radii of curvature of 100 cm.

* * * * *